(12) United States Patent
Zuczek

(10) Patent No.: US 8,948,512 B2
(45) Date of Patent: Feb. 3, 2015

(54) METHODS, SYSTEMS, AND MEDIA FOR IMAGE PROCESSING USING HIERARCHICAL EXPANSION

(71) Applicant: Pawel Zuczek, Wroclaw (PL)

(72) Inventor: Pawel Zuczek, Wroclaw (PL)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 13/833,654

(22) Filed: Mar. 15, 2013

(65) Prior Publication Data

US 2014/0270527 A1 Sep. 18, 2014

(51) Int. Cl.
*G06K 9/34* (2006.01)
*G06T 7/00* (2006.01)

(52) U.S. Cl.
CPC .................................... *G06T 7/0081* (2013.01)
USPC ............ 382/180; 382/278; 382/294; 382/298

(58) Field of Classification Search
USPC .......... 382/180, 278, 294, 298; 340/988, 990; 701/494; 707/722, 724; 715/273
See application file for complete search history.

(56) References Cited

U.S. PATENT DOCUMENTS 5,961,571 A * 10/1999 Gorr et al. ...................... 701/494
8,489,987 B2 * 7/2013 Erol et al. ...................... 715/273
8,837,820 B2 * 9/2014 Murray et al. ................. 382/159

* cited by examiner

*Primary Examiner* — Anh Do
(74) *Attorney, Agent, or Firm* — Byrne Poh LLP

(57) ABSTRACT

Methods, systems, and media for image processing using hierarchical expansion are provided. More particularly, the hierarchical expansion can include a merge expansion and/or a refine expansion. In some embodiments, a method for image processing, comprising: receiving a plurality of images, wherein each of the plurality of images has one of a plurality of resolutions; for a first image from the plurality of images that has a first resolution, determining a first set of labels corresponding to each pixel of the first image; and for a second image from the plurality of images that has a second resolution, generating a second set of labels corresponding to each pixel of the second image based on the first set of labels.

30 Claims, 7 Drawing Sheets

|     |     |     |
| --- | --- | --- |
| P00 | P10 | P20 |
| P01 | P11 | P21 |
| P02 | P12 | P22 |

FIG. 4A

| P00,0 | P00,1 | P10,0 | P10,1 | P20,0 | P20,1 |
| --- | --- | --- | --- | --- | --- |
| P00,2 | P00,3 | P10,2 | P10,3 | P20,2 | P20,3 |
| P01,0 | P01,1 | P11,0 | P11,1 | P21,0 | P21,1 |
| P01,2 | P01,3 | P11,2 | P11,3 | P21,2 | P21,3 |
| P02,0 | P02,1 | P12,0 | P12,1 | P22,0 | P22,1 |
| P02,2 | P02,3 | P12,2 | P12,3 | P22,2 | P22,3 |

FIG. 4B

METHODS, SYSTEMS, AND MEDIA FOR IMAGE PROCESSING USING HIERARCHICAL EXPANSION

TECHNICAL FIELD

Methods, systems, and media for image processing using hierarchical expansion are provided. More particularly, the disclosed subject matter relates to determining labels associated with an image having a given resolution.

BACKGROUND

Many computer vision problems involve assigning labels to image elements, such as pixels, texels, voxels, etc. In image restoration applications, labels associated with an image can be used to recover the original pixel intensities of the image. In this case, a label of a pixel within an image can indicate the intensity of the pixel. In stereo video applications, labels associated with a pair of stereo images can be used to reconstruct a three-dimensional image. In this case, labels can indicate depth information or disparity values. In image segmentation applications, labels associated with the pixels in an image can be used to indicate whether a pixel is part of the foreground or the background. Depending on the application, the label can be selected from two possible labels (a binary label situation) or from a larger number of labels (a multi-label situation). In some applications, the number of labels can be very large.

A number of energy minimization techniques have been developed for solving binary label and multi-label problems. For example, graph cut is one technique that can be used to optimize binary labels and can be extended to multi-label problems using an alpha expansion technique. However, alpha-expansion iteratively and exhaustively progresses through the number of labels and the number of pixels during, for example, image reconstruction. As the number of labels and the number of pixels increases, this results in slow reconstruction and computation times.

SUMMARY

In accordance with various embodiments of the disclosed subject matter, mechanisms for image processing using hierarchical expansion are provided.

In accordance with some embodiments of the disclosed subject matter, a method for image processing is provided, the method comprising: receiving, using a hardware processor, a plurality of images, wherein each of the plurality of images has one of a plurality of resolutions; for a first image from the plurality of images that has a first resolution, determining, using the hardware processor, a first set of labels corresponding to each pixel of the first image; and for a second image from the plurality of images that has a second resolution, generating, using the hardware processor, a second set of labels corresponding to each pixel of the second image based on the first set of labels by: (a) scaling, using the hardware processor, the first set of labels to generate a set of scaled labels; (b) determining, using the hardware processor, a set of proposed labels for each pixel of the second image based on the set of scaled labels; (c) generating, using the hardware processor, a probability score for each proposed label in the set of proposed labels; (d) selecting, using the hardware processor, a proposed label from the set of proposed labels based at least in part on the probability score; and (e) determining, using the hardware processor, whether to assign the proposed label for each pixel to the second set of labels of the second image.

In accordance with some embodiments of the disclosed subject matter, a system for image processing is provided. The system comprises a hardware processor that: receives a plurality of images, wherein each of the plurality of images has one of a plurality of resolutions; for a first image from the plurality of images that has a first resolution, determines a first set of labels corresponding to each pixel of the first image; and for a second image from the plurality of images that has a second resolution, generates a second set of labels corresponding to each pixel of the second image based on the first set of labels by: (a) scaling the first set of labels to generate a set of scaled labels; (b) determining a set of proposed labels for each pixel of the second image based on the set of scaled labels; (c) generating a probability score for each proposed label in the set of proposed labels; (d) selecting a proposed label from the set of proposed labels based at least in part on the probability score; and (e) determining whether to assign the proposed label for each pixel to the second set of labels of the second image.

In accordance with some embodiments of the disclosed subject matter, a computer-readable medium containing computer-executable instructions that, when executed by a processor, cause the process to perform a method for image processing, is provided. The method comprises: receiving a plurality of images, wherein each of the plurality of images has one of a plurality of resolutions; for a first image from the plurality of images that has a first resolution, determining a first set of labels corresponding to each pixel of the first image; and for a second image from the plurality of images that has a second resolution, generating a second set of labels corresponding to each pixel of the second image based on the first set of labels by: (a) scaling the first set of labels to generate a set of scaled labels; (b) determining a set of proposed labels for each pixel of the second image based on the set of scaled labels; (c) generating a probability score for each proposed label in the set of proposed labels; (d) selecting a proposed label from the set of proposed labels based at least in part on the probability score; and (e) determining whether to assign the proposed label for each pixel to the second set of labels of the second image.

In accordance with some embodiments of the disclosed subject matter, a system for image processing is provided. The system comprises: means for receiving a plurality of images, wherein each of the plurality of images has one of a plurality of resolutions; for a first image from the plurality of images that has a first resolution, means for determining a first set of labels corresponding to each pixel of the first image; and for a second image from the plurality of images that has a second resolution, means for generating a second set of labels corresponding to each pixel of the second image based on the first set of labels by including: (a) means for scaling the first set of labels to generate a set of scaled labels; (b) means for determining a set of proposed labels for each pixel of the second image based on the set of scaled labels; (c) means for generating a probability score for each proposed label in the set of proposed labels; (d) means for selecting a proposed label from the set of proposed labels based at least in part on the probability score; and (e) means for determining whether to assign the proposed label for each pixel to the second set of labels of the second image.

In some embodiments, the system further comprises: means for generating an incremented proposed label by incrementing the selected proposed label by a given value; and means for selecting, for each pixel in the second image, an updated label between the proposed label and the incremented proposed label using a graph cut technique.

In some embodiments, the first set of labels corresponds to a first set of disparity values between the first image and a third image and the second set of labels corresponds to a second set of disparity values between the second image and a fourth image.

In some embodiments, the system further comprises: means for selecting at least two proposed labels from the set of proposed labels based at least in part on the probability score; and means for selecting one proposed label from the at least two proposed labels using a graph cut technique.

In some embodiments, the system further comprises means for determining whether to replace an initial label corresponding to a pixel in the first image with a predetermined label.

In some embodiments, the system further comprises: means for determining that the second resolution is not a desired resolution; and means for repeating (a)-(e) until an image having the desired resolution is reached.

In some embodiments, the second resolution is greater than the first resolution.

In some embodiments, the first set of labels is scaled by a scale factor that is determined based on the first resolution and the second resolution.

In some embodiments, the set of proposed labels associated with a pixel in the second image includes at least one scaled label associated with the pixel and a plurality of scaled labels from neighboring pixels.

In some embodiments, the system further comprises means for selecting the first image and the second image based on resolution.

BRIEF DESCRIPTION OF THE DRAWINGS

Various objects, features, and advantages of the disclosed subject matter can be more fully appreciated with reference to the following detailed description of the disclosed subject matter when considered in connection with the following drawing, in which like reference numerals identify the like elements.

FIG. 4A is an illustrative image having a given resolution in accordance with some embodiments of the disclosed subject matter.

FIG. 4B is an illustrative image having a resolution greater than that of the image in FIG. 4A in accordance with some embodiments of the disclosed subject matter.

DETAILED DESCRIPTION

Figure 1:
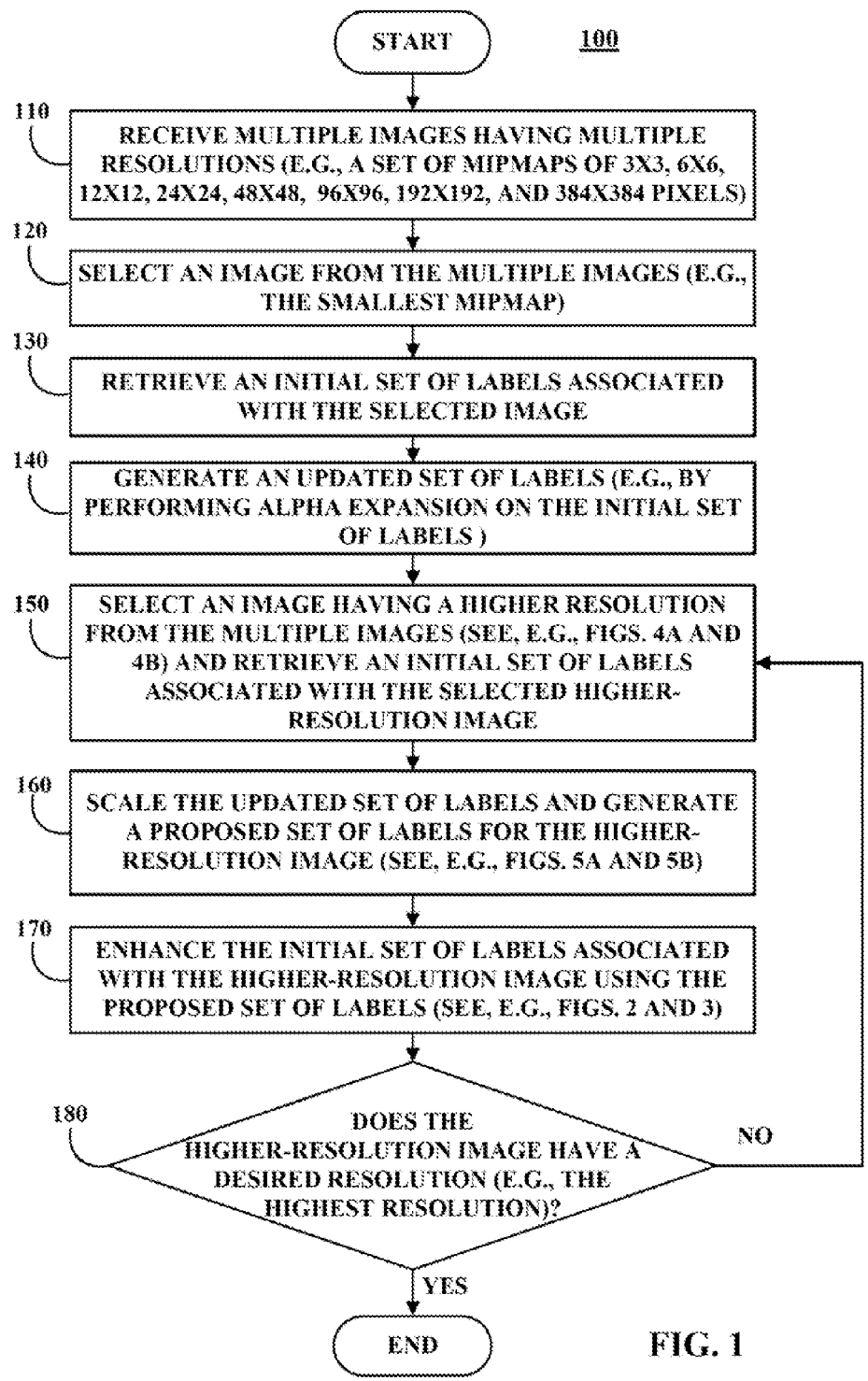
FIG. 1 is a flow chart of an illustrative process for image processing, where labels associated with an image having a given resolution are determined based on labels from an associated image in accordance with some embodiments of the disclosed subject matter.

In accordance with some embodiments of the disclosed subject matter, mechanisms for image processing are provided.

In some embodiments, the mechanisms can determine labels associated with an image having a given resolution based on labels from an associated image. For example, the mechanisms can make such determination based on labels associated with an image having a resolution lower than the given resolution. In a more particular example, the associated image can be an image within a mipmap at a lower mipmap level.

In some embodiments, the mechanisms can determine an initial set of labels associated with each pixel of the associated image (e.g., the smallest mipmap image within the mipmap). The mechanisms can determine the initial set of labels using a suitable energy optimization algorithm, such as an alpha-expansion algorithm.

In some embodiments, the mechanisms can determine a set of proposed labels for the image having the given resolution by enlarging the initial set of labels in a hierarchical manner. For example, the initial set of labels from the associated image can be scaled by a suitable factor (e.g., a factor of two). For each pixel, a set of proposed labels can be generated from the scaled set of labels. Each proposed label from the set of proposed labels can be assigned a score. For example, the score can indicate the probability that the proposed label is part of the final solution. Proposed labels associated with each pixel can be selected based at least in part on the score (e.g., proposed labels having scores greater than a given threshold are selected). The mechanisms can then use a suitable energy optimization algorithm, such as a graph cut algorithm, to determine a proposed label for each pixel. This is sometimes referred to herein as a "merge expansion."

In some embodiments, the mechanisms can continue to refine the proposed label for each pixel. It should be noted that by scaling and/or enlarging the image and its labels by a suitable factor, the available depth precision has been increased. For each pixel, the mechanisms can increment the proposed label determined using the merge expansion to generate an incremented proposed label (e.g., increase by a value of one). The mechanisms can then use a suitable energy optimization algorithm, such as a graph cut algorithm, to select between the proposed label and the incremented proposed label. The selected label can be assigned to the corresponding pixel in the image having the given resolution. This is sometimes referred to herein as a "refine expansion."

In some embodiments, the mechanisms can repeat the above-mentioned merge expansion and refine expansion until reaching an image having a desired resolution (e.g., the largest mipmap image within the mipmap, a full resolution image, etc.).

These mechanisms can be used in a variety of applications. For example, these mechanisms can be used to reconstruct a three-dimensional model from multiple images. In a more particular example, these mechanisms can be used to decrease reconstruction times and/or decrease computational costs when reconstructing particular images without preparations that include ground truth reconstruction data and/or learning approaches. In another more particular example, these mechanisms can be used to inhibit the number of times particular instructions are executed (e.g., the number of times the alpha-expansion algorithm is executed to reconstruct an image).

It should be noted that these mechanisms can be used to solve any suitable label classification problems. In a more particular example, these mechanisms can be used to solve a binary label classification problem by classifying the members of a set of objects into two groups. In another more particular example, theses mechanisms can be used to solve a multi-label classification problem by classifying the members of a set of objects into multiple groups.

As another example, these mechanisms can be used to solve label classification problems. In a more particular example, these mechanisms can be used to solve a binary label classification problem by classifying the members of a set of objects into two groups. In another more particular example, theses mechanisms can be used to solve a multi-label classification problem by classifying the members of a set of objects into multiple groups.

Turning to FIG. 1, FIG. 1 is a flow chart of an illustrative process 100 for image processing, where labels associated with an image having a given resolution are determined based on labels from an associated image in accordance with some embodiments of the disclosed subject matter. The associated image can, for example, be a version of the image having a resolution lower than the given resolution, such as an image within a mipmap at a lower mipmap level.

Process 100 can begin by receiving multiple images having multiple resolutions at 110. For example, an image processing system can receive multiple images in the form of one or more mipmaps or texture maps. In a more particular embodiment, the image processing system can receive a set of mipmaps, where each mipmap includes an image having a particular resolution (e.g., a first mipmap containing a full resolution image that has a size of 256×256 pixels, a second mipmap containing a version of the image that has a size of 128×128 pixels, a third mipmap containing a version of the image that has a size of 64×64 pixels, a fourth mipmap containing a version of the image that has a size of 32×32 pixels, a fifth mipmap containing a version of the image that has a size of 16×16 pixels, a sixth mipmap containing a version of the image that has a size of 8×8 pixels, a seventh mipmap containing a version of the image that has a size of 4×4 pixels, and an eighth mipmap containing a version of the image that has a size of 2×2 pixels). Although the height and width of each image in the mipmap in the above-mentioned example is half the size of a preceding image, the mipmap can be any suitable shape or size. In another more particular embodiment, the image processing system can receive a mipmap with mipmap levels that includes a full resolution version of the image stored at the highest mipmap level and a lowest resolution version of the image (e.g., an image having the size of a single pixel) stored at the lowest mipmap level. Each mipmap can be a version of a texture having a different level of detail. It should be noted that the image processing system can receive mipmaps of images having any suitable sizes and/or any suitable resolutions that accompany an image or texture at full resolution.

Although the embodiments described herein generally refer to the obtaining, from mipmaps, an image having a particular size or resolution and labels associated with pixels in the image, this is merely illustrative. For example, the image processing system can retrieve a full resolution image and additional instances of the image having lesser resolutions from any suitable source. In another example, the image processing system can retrieve images having various resolutions from different computing devices and/or at different times.

In some embodiments, the image processing system can calculate the multiple images and, more particular, the multiple mipmaps. For example, the image processing system can receive a first mipmap that includes input images at full resolution. The image processing system can then calculate a second mipmap that includes the input images at a reduced resolution (e.g., where the width and height are two times smaller than the input images in the first mipmap). By successively generating lower-resolution mipmaps (e.g., each two times smaller than the images in the previous mipmap), the image processing system can generate a set of mipmaps.

At 120, the image processing system can select an image from the multiple images received at 110. For example, the image processing system can select the image having the lowest resolution from the received images (e.g., the smallest mipmap image). In a more particular example, the image processing system can select an image having 3×3 pixels (shown in FIG. 4A) from a set of images having 3×3 pixels, 6×6 pixels, 12×12 pixels, 24×24 pixels, 48×48 pixels, 96×96 pixels, 192×192 pixels, and 384×384 pixels.

In some embodiments, the image processing system can retrieve an initial set of labels associated with the selected image at 130. For example, after selecting a 3×3 image having pixels $P_{00}, \ldots, P_{22}$ (as shown in FIG. 4A), the image processing system can retrieve a set of labels $l_{00}, \ldots, l_{22}$, where each of the six labels corresponds to one of six pixels in the 3×3 pixel image. It should be noted that the labels can represent any suitable pixel property, such as depth (e.g., for stereo video), object index (e.g., for object segmentation), intensity (e.g., for image restoration), etc. For example, in stereo video applications, the labels can represent depth information associated with a pair of images including a first image (e.g., the image selected at 120) and a second image. More particularly, for example, each of the initial set of labels can represent a disparity value between the value of a pixel of the first image and the value of a corresponding pixel of the second image. Alternatively, the image processing system can calculate the initial set of labels associated with the selected image using a suitable energy optimization algorithm, such as an alpha-expansion algorithm.

Figures 5A, 5B:
FIG. 5A is an example of a scaled set of labels associated with the image in FIG. 4A in accordance with some embodiments of the disclosed subject matter.
FIG. 5B is an example of a proposed set of labels associated with the image in FIG. 4B in accordance with some embodiments of the disclosed subject matter.

At 140, the image processing system can generate an updated set of labels based on the initial set of labels. For example, for each pixel $p_n$ (n∈N×N) of the selected image having an initial label $l_n$, the image processing system can determine whether to modify $l_n$ to a predetermined label. Based on the determination, the image processing system can update the initial set of labels retrieved at 130 and generate an updated set of labels $l'_0, \ldots, l'_{N \times N}$. An illustrative example of an updated set of labels for a 3×3 pixel mipmap image is further described in FIG. 5A.

In a more particular example, the image processing system can enhance the initial set of labels based on an energy function. One example of an energy function can include a smoothness component and a data component, where the smoothness component can measure the extent to which the enhanced label is not piecewise smooth and the data component can measure the disagreement between the updated label and the initial label. Another exemplary energy function can include a component that measures the cost of assigning a label to a pixel and a component that measures the cost of assigning the labels to the adjacent pixels. It should be noted, however, that any suitable energy function can be used.

In some embodiments, the image processing system can generate the updated set of labels by optimizing the energy function. For example, the image processing system can generate an updated set of labels from the initial set of labels using any suitable technique, such as the alpha-expansion algorithm. In such an example, the alpha-expansion algorithm divides the labels between alpha labels and non-alpha labels and performs a min cut between those labels, thereby allowing non-alpha labels to change to alpha labels. That is, using the alpha-expansion algorithm, the image processing system can change at least one initial label to an alpha label.

In connection with the above mentioned example, in response to calculating a label using the alpha-expansion algorithm, the image processing system can determine whether to replace the initial label $l_n$ corresponding to pixel $p_n$ with an alpha label. For example, as described above, the image processing system can replace initial label $l_n$ with an alpha label in response to determining that the updated label decreases and/or minimizes the energy provided in the above-mentioned energy function. The image processing system can enhance the initial set of labels by generating an updated set of labels that minimizes the energy over all labels within one or more α-expansions of the initial set of labels. Accordingly, upon using the alpha-expansion algorithm or any other suitable technique, the image processing system can assign an updated label to each pixel of the selected image—e.g., label $l'_{00}$ for pixel $p_{00}$ and label $l'_{22}$ for pixel $p_{22}$.

Referring back to FIG. 1, at 150, the image processing system can select an image having a resolution higher than that of the image selected at 120 from the multiple images received at 110. For example, after selecting an image of N×N pixels at 120, the image processing system can select an image of M×M pixels, where M is greater than N. In a more particular example, the selected image can be an image having the next highest resolution in a series of received images. When a mipmap of images is received by the image processing system, the selected image can be the image at the subsequent miplevel. As shown in FIGS. 4A and 4B, FIG. 4A is an illustrative example of an image having a particular resolution (e.g., 3×3 pixel image) and FIG. 4B is an illustrative example of an image having a resolution greater than the image in FIG. 4A (e.g., a 6×6 pixel image). FIG. 4A is an illustrative example of an image selected at 120, while FIG. 4B is an illustrative example of an image selected at 150.

In some embodiments, in response to selecting a higher-resolution image, the image processing system can retrieve an initial set of labels associated with the selected higher-resolution image. For example, the image processing system can retrieve a set of labels $l_0, \ldots, l_{M \times M}$ for the selected M×M image. Although the embodiments described herein select an image having the next highest resolution as the higher-resolution image, this is merely illustrative. The image processing system can select any suitable image from the multiple images having a resolution higher than that of the image selected at 120.

In some embodiments, at 160, the image processing system can scale the updated set of labels generated at 130 and generate a proposed set of labels for the higher-resolution image selected at 150. For example, to begin a merge expansion, after generating an updated set of labels for an N×N pixel image, the image processing system can increase the size of the updated set of labels from N×N pixels to M×M pixels to generate a proposed set of labels for an M×M image. In a more particular example, as described in connection with FIGS. 5A and 5B, the image processing system can magnify the updated set of labels in FIG. 5A by a factor of 2 to produce a set of labels for the upsampled image shown in FIG. 5B (where the width and the height of the image are doubled from the image shown in FIG. 5A). The image processing system can use the proposed set of labels for the higher-resolution image of FIG. 4B.

In some embodiments, at 170, the image processing system can enhance the set of labels retrieved at 150 and associated with the higher-resolution image of FIG. 4B using the proposed set of labels (e.g., labels that have been resized). This is further described hereinbelow in connection with FIGS. 2 and 3. As described, the image processing system can select a proposed label from each set of proposed labels and enhance the initial set of labels associated with the higher-resolution image.

At 180, the image processing system can determine whether an enhanced set of labels has been generated for an image having a desired resolution. An example of an image having a desired resolution can be the image having the highest resolution out of the multiple images received at 110. For example, the image processing system can determine whether an enhanced set of labels has been generated for the largest mipmap (e.g., a mipmap having 256×256 pixels). In the set of mipmaps described above, the image processing system can determine whether an enhanced set of labels has been generated for the first mipmap in the set of mipmaps. In another suitable example, the image processing system can receive a desired resolution value (e.g., 384×384 pixels) from another component (e.g., an application executing the image processing system). In yet another suitable example, the image processing system can continue selecting subsequent images having a higher resolution and generating enhanced labels until the image from the multiple images that has the highest resolution has been selected.

Alternatively, in response to determining that an image having the desired resolution has not been reached (e.g., an enhanced set of labels for the image having the desired resolution has not been generated), the image processing system can return to 150 and select a subsequent higher-resolution image from the multiple images received at 110. The image processing system can then generate an enhanced set of labels for that image by executing steps 150-170. In a more particular example, after generating an enhanced set of labels for a mipmap image having 6×6 pixels at 160, the image processing system can determine that an enhanced set of labels has not been generated for the largest mipmap image of the multiple images. Additionally or alternatively, the image processing system can determine that the highest resolution image (e.g., an image at full resolution) has not been reached. The image processing system can then select a mipmap image having a higher resolution (e.g., a mipmap image having 12×12 pixels) and retrieve an initial set of labels associated with the selected mipmap image. The image processing system can scale the enhanced set of labels associated with the mipmap image having 6×6 pixels to generate a proposed set of labels for the mipmap image having 12×12 pixels. The image processing system can then enhance the initial set of labels associated with the mipmap image having 12×12 pixels based on the proposed set of labels. These and other features are described further in connection with FIGS. 2 and 3.

Upon determining, at 180, that an enhanced set of labels has been generated for an image having the desired resolution (e.g., the first mipmap image has been processed, an image having the highest resolution of the multiple images has been processed, etc.), the image processing system can return the enhanced set of label generated at 170 as the labels for the image having the desired resolution.

Figure 2:
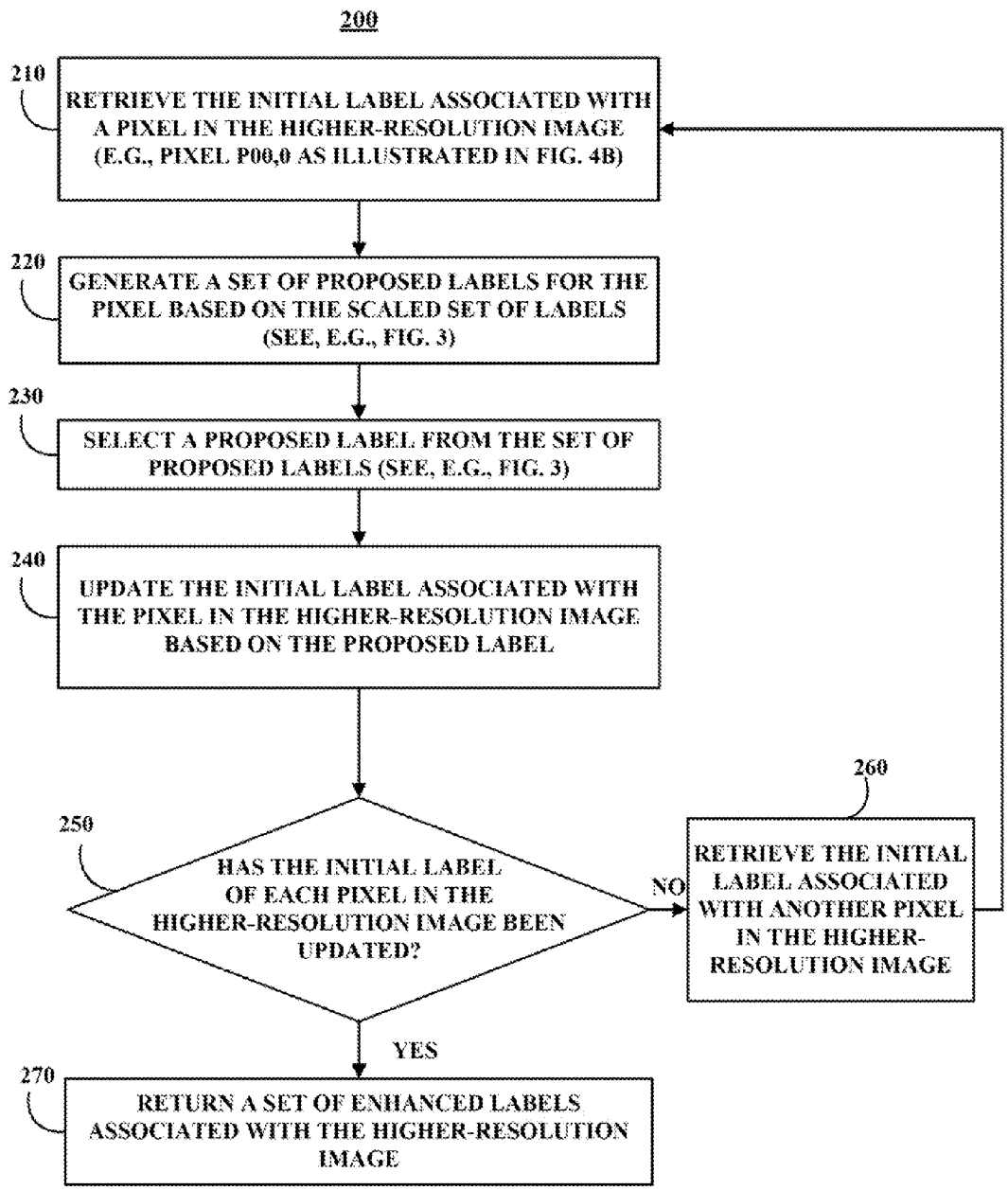
FIG. 2 is a flow chart of an illustrative process for generating an enhanced set of labels for a higher-resolution image based on a proposed set of labels in accordance with some embodiments of the disclosed subject matter.

Turning to FIG. 2, FIG. 2 is a flow chart of an illustrative process 200 for generating an enhanced set of labels for a higher-resolution image based on a proposed set of labels in accordance with some embodiments of the disclosed subject matter.

Merge expansion process 200 can begin by retrieving an initial label associated with a pixel in the higher-resolution image at 210. For example, as shown in FIG. 4B, the image processing system can retrieve the initial label associated with pixel $p_{00,0}$. It should be noted that, although the embodiments described herein generally process the first pixel $p_{00,0}$ of the higher-resolution image at 210, this is merely illustrative. The image processing system can retrieve the initial label or value associated with any pixel in the higher-resolution image at 210 (e.g., the initial label associated with pixel $p_{11,0}$).

At 220, the image processing system can generate a set of proposed labels for the pixel based on the scaled set of labels. For example, as described further in connection with FIG. 3, the image processing system can select a label from the scaled set of labels that corresponds to the pixel as a first proposed label. The image processing system can then generate an initial set of proposed labels including the first proposed label and its neighboring labels. It should be noted that the neighboring labels can be connected to the first proposed label in any suitable manner, e.g., horizontally, vertically, and/or diagonally. More particularly, for example, for pixel $p_{00,0}$ in FIG. 4B, the labels or values associated with pixels $p_{00}$, $p_{10}$, $p_{01}$, and $p_{11}$ can be used to compose a set of proposed labels for that pixel. In some embodiments, the image processing system can also generate a proposed label by increasing the value of a proposed label of the set of initial proposed labels.

At 230, the image processing system can select a proposed label from the set of proposed labels generated at 220. As described further in connection with FIG. 3, the image processing system can calculate and assign a score to each of the initial set of proposed labels and select multiple proposed labels based on the scores. For example, the image processing system can calculate a probability score indicating the probability that the proposed label is part of enhanced set of labels, rank the proposed labels based on the probability score, and select two of the proposed labels from the initial set of proposed labels based on ranking. In this example, the image processing system can then select one proposed label from the previously selected proposed labels by using a graph cut technique or any other suitable energy minimization or optimization algorithm.

Additionally or alternatively, the image processing system can perform a refine expansion process by increasing the value of the selected proposed label (e.g., by one) to generate a new proposed label. The image processing system can then select one proposed label from the new proposed label (e.g., the incremented label) and the previously selected proposed label by using a graph cut technique or any other suitable energy minimization or optimization algorithm.

At 240, the image processing system can update the label associated with the pixel in the higher-resolution image using the proposed label selected at 230. For example, the image processing system can replace the initial label corresponding to the pixel (e.g. pixel $p_{00,0}$) with the proposed label selected at 230. Alternatively, the image processing system can determine that the initial label corresponding to the pixel (e.g., pixel $p_{00,0}$) should be retained.

At 250, the image processing system can determine whether the initial label corresponding to each pixel in the higher-resolution image has been updated. In response to determining that at least one initial label associated with the higher-resolution image has not been updated, the image processing system can retrieve the initial label associated with another pixel in the higher-resolution image at 260. For example, as described above in connection with steps 220-240, the image processing system can select a proposed label for pixel $p_{00,0}$ shown in FIG. 4B and update the label of the higher-resolution image using the selected proposed label. In response to determining that $p_{00,0}$ is not the last pixel in the higher-resolution image, the image processing system can retrieve the initial label that is associated with pixel $p_{00,1}$ shown in FIG. 4B. The image processing system can then update the label associated with pixel $p_{00,1}$ by executing steps 220-240. Although the embodiments described herein generally update the labels associated with pixels of the higher-resolution image in sequence, this is merely illustrative. The image processing system can generate updated labels in any suitable order.

At 270, in response to determining that the initial labels associated with the higher-resolution image have been updated, the image processing system can return the updated labels as the enhanced set of labels associated with the higher-resolution image.

Figure 3:
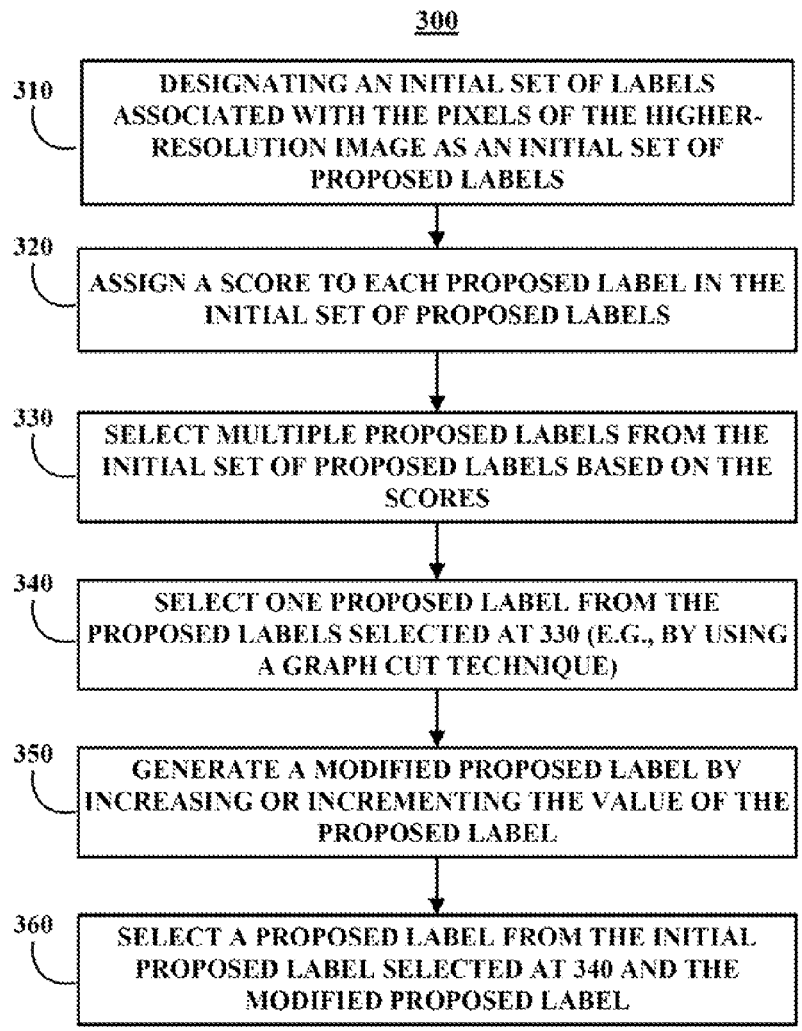
FIG. 3 is a flow chart of an illustrative process for selecting a proposed label from a set of proposed labels for a pixel in a higher-resolution image in accordance with some embodiments of the disclosed subject matter.

Turning to FIG. 3, FIG. 3 is a flow chart of an illustrative process 300 for selecting a proposed label from a set of proposed labels for a pixel in the higher-resolution image in accordance with some embodiments of the disclosed subject matter.

Process 300 can begin by designating an initial set of labels associated with the pixels of the higher-resolution image, such as those obtained at 150, as an initial set of proposed labels at 310. For example, for a pixel in the higher-resolution image, the image processing system can select a label from the initial set of labels corresponding to the pixel as a first proposed label. The image processing system can then generate an initial set of proposed labels to include the first proposed label and its neighboring labels. It should be noted that the neighboring labels can be connected to the first proposed label in any suitable way, e.g., horizontally, vertically, and/or diagonally. In a more particular example, the image processing system processor can select label $l'_{00,0}$ shown in FIG. 5B as the initial label for pixel $p_{00,0}$ shown in FIG. 4B. The image processing system can then expand the initial set of proposed labels to include labels $l'_{00}$, $l'_{10}$, $l'_{01}$, and $l'_{11}$. In another more particular example, the image processing system can select labels $l'_{10}$, $l'_{20}$, $l'_{11}$, and $l'_{21}$ as the initial set of proposed labels for pixel $p_{00,1}$ shown in FIG. 4B. In yet another more particular example, the image processing system can select labels $l'_{01}$, $l'_{11}$, $l'_{02}$, and $l'_{12}$ as the initial set of proposed labels for pixel $p_{00,2}$ shown in FIG. 4B. In a further example, the image processing system can select labels $l'_{11}$, $l'_{21}$, $l'_{12}$, and $l'_{22}$ as the initial set of proposed labels for pixel $p_{00,3}$ shown in FIG. 4B.

At 320, the image processing system can assign a score to each proposed label in the initial set of proposed labels. For example, the image processing system can calculate and assign a probability score to each proposed label based on the probability that the proposed label can be a part of the enhanced set of labels for the image having the desired resolution. More particularly, for example, the image processing system can determine that there is a high probability that the first proposed label is part of the enhanced set of labels for the image having the desired resolution. Thus, the image processing system can assign a high probability score to the first proposed label.

At 330, the image processing system can select multiple proposed labels from the initial set of proposed labels based on the calculated scores. For example, the image processing system can rank the proposed labels based on the calculated scores and extract two proposed labels based on the ranked scores. In a more particular example, the image processing system can select two proposed labels having the highest scores from the initial set of proposed labels. It should be noted that, although the embodiments described herein generally relate to selecting two proposed labels using a suitable ranking algorithm, this is merely illustrative.

Additionally, the image processing system can scale the multiple proposed labels selected at 330. For example, the image processing system can multiply the values of the selected proposed labels by a factor (e.g., a factor of two). It should be noted that, in some embodiments, the value of the factor can be based on the resolutions of the images selected at 120 and 150 (FIG. 1). In a more particular example, the image processing system can multiply the values of the proposed labels by two in response to determining that the image selected at 120 is one-fourth of the total area of the higher resolution selected at 150.

At 340, the image processing system can select one proposed label from the multiple proposed labels selected at 330. For example, the image processing system can select one proposed label from the previously selected proposed labels by using a graph cut technique or any other suitable energy minimization or optimization algorithm. As described above, the image processing system can select a proposed label from multiple proposed labels by minimizing an energy function corresponding to the image. In another more particular example, the image processing system can also select a proposed label from multiple proposed labels by determining a maximum flow at a minimum cost from a specified source to a specified sink. Additionally or alternatively, the image processing system can select a proposed label from multiple labels by determining a minimum cut that minimizes an energy function.

In some embodiments, the image processing system can generate a modified proposed label by increasing or incrementing the value of the proposed label at 350. For example, the image processing system can increase the value of the proposed label selected at 340 by a particular value (e.g., one). In some embodiments, the value of the increment can be based on the resolutions of the images selected at 120 and 150 (FIG. 1).

At 360, the image processing system can select a proposed label from the initial proposed label selected at 340 and the modified proposed label generated at 350. For example, the image processing system can select a proposed label by using a graph cut technique or any other suitable energy minimization or optimization algorithm. In a more particular example, the image processing system can select a proposed label by minimizing an energy function. In another more particular example, the image processing system can also select a proposed label by determining a maximum flow at a minimum cost from a specified source to a specified sink. Additionally or alternatively, the image processing system can select one proposed label by determining a minimum cut that minimizes an energy function.

Figure 6:
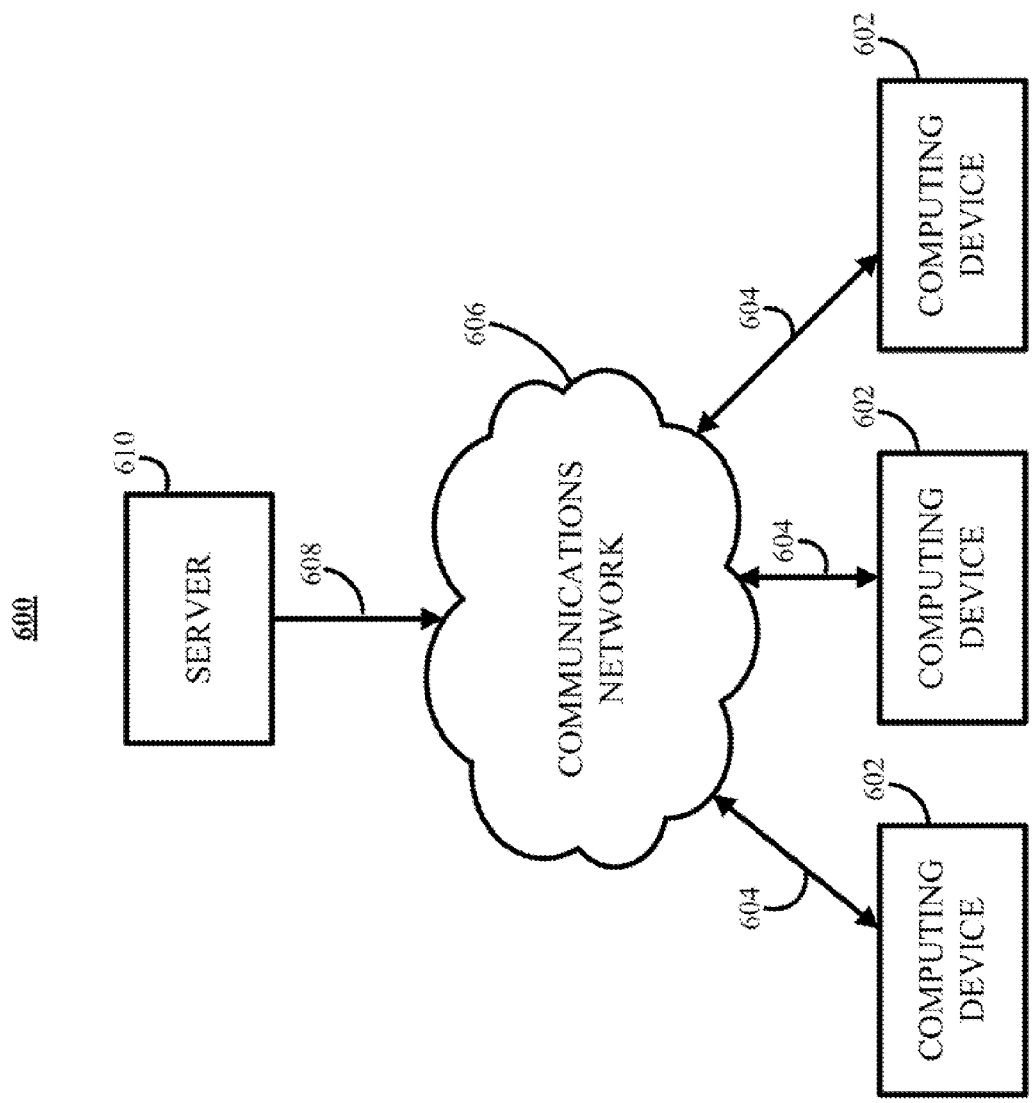
FIG. 6 is a block diagram of an illustrative system for image processing in accordance with some embodiments of the disclosed subject matter.

FIG. 6 is a generalized schematic diagram of a system on which the image processing mechanisms can be implemented in accordance with some embodiments of the disclosed subject matter. As illustrated, system 600 can include one or more computing devices 602, such as a user computing device, a tablet computing device, and/or any suitable device for receiving multiple images and determine labels for an image having a given resolution. For example, computing device 602 can be implemented as a personal computer, a tablet computing device, a personal digital assistant (PDA), a portable email device, a multimedia terminal, a mobile telephone, a gaming device, a set-top box, a television, a smart television, etc.

In some embodiments, computing device 602 can include a storage device, such as a hard drive, a digital video recorder, a solid state storage device, a gaming console, a removable storage device, or any other suitable device for storing images, image information, labels, values, mipmaps, etc.

In some embodiments, computing device 602 can include a second screen device. For example, the second screen device can display an image of a given resolution, an associated image, a set of mipmaps, etc.

Computing devices 602 can be local to each other or remote from each other. For example, when one computing device 602 is a television and another computing device 602 is a second screen device (e.g., a tablet computing device, a mobile telephone, etc.), the computing devices 602 may be located in the same room. Computing devices 602 are connected by one or more communications links 604 to a communications network 606 that is linked via a communications link 608 to a server 610.

System 600 can include one or more servers 610. Server 610 can be any suitable server for providing access to the image processing mechanisms, such as a processor, a computer, a data processing device, or a combination of such devices. For example, the image processing system can be distributed into multiple backend components and multiple frontend components or interfaces. In a more particular example, backend components, such as data distribution can be performed on one or more servers 610. Similarly, the graphical user interfaces displayed by the image processing application, such as a user interface for retrieving multiple images having multiple resolutions or an interface for providing preferences relating to desired resolutions, can be distributed by one or more servers 610 to computing device 602.

In some embodiments, server 610 can include any suitable server for accessing metadata relating to multiple images having multiple resolutions (e.g., a mipmap set), the resolution of an image, a set of labels associated with an image, etc.

More particularly, for example, each of the computing devices 602 and server 610 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 602 can be implemented as a personal computer, a tablet computing device, a personal digital assistant (PDA), a portable email device, a multimedia terminal, a mobile telephone, a gaming device, a set-top box, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 6, communications network 606 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 604 and 608 may be any communications links suitable for communicating data between computing devices 602 and server 610, such as network links, dial-up links, wireless links, hard-wired links, any other suitable communications links, or a combination of such links. Computing devices 602 enable a user to access features of the application. Computing devices 602 and server 610 may be located at any suitable location. In one embodiment, computing devices 602 and server 610 may be located within an organization. Alternatively, computing devices 602 and server 610 may be distributed between multiple organizations.

Figure 7:
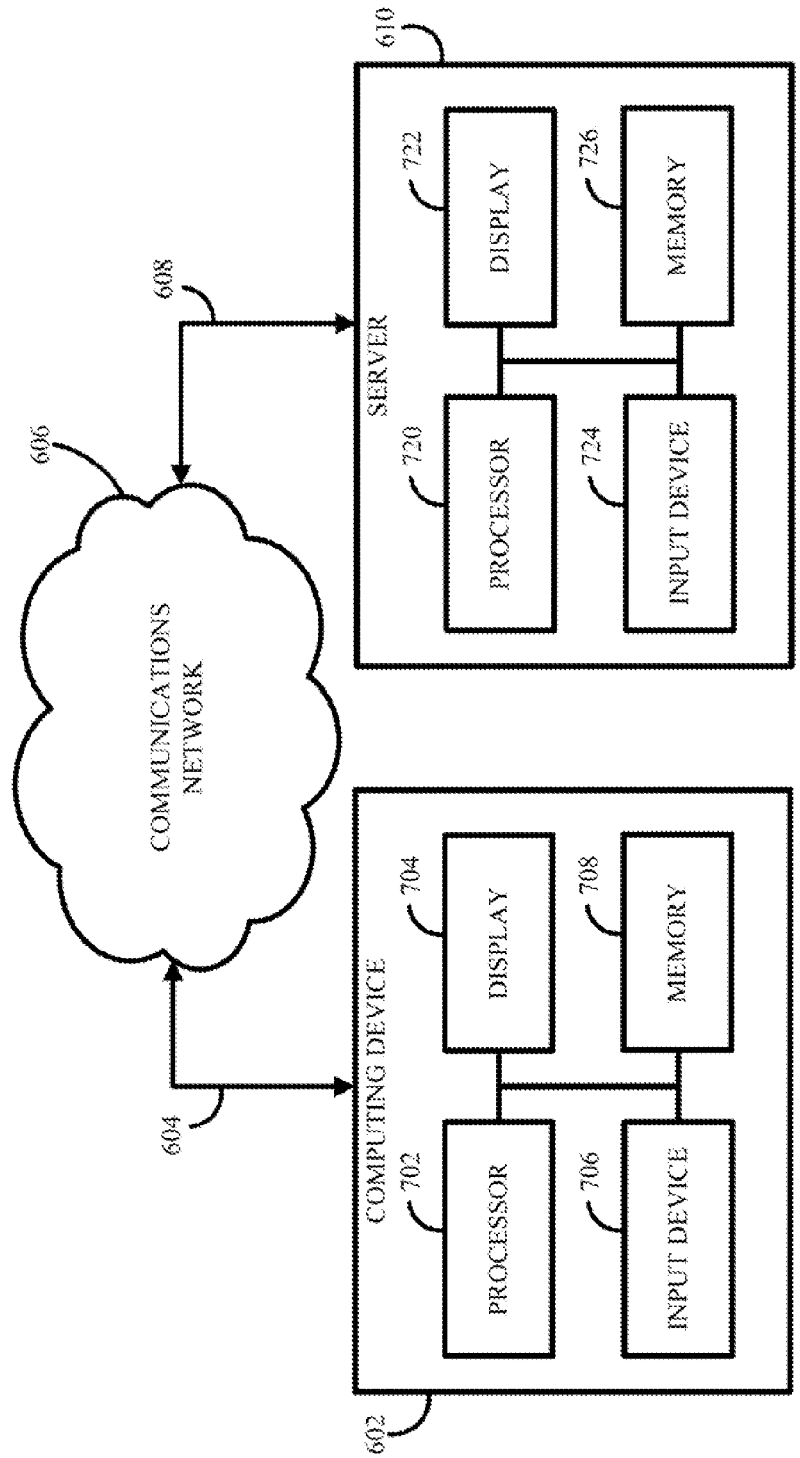
FIG. 7 is a block diagram of an illustrative computing device and server as provided, for example, in FIG. 6 in accordance with some embodiments of the disclosed subject matter.

Referring back to FIG. 6, the server and one of the computing devices depicted in FIG. 6 are illustrated in more detail in FIG. 7. Referring to FIG. 7, computing device 602 may include processor 702, display 704, input device 706, and memory 708, which may be interconnected. In a preferred embodiment, memory 708 contains a storage device for storing a computer program for controlling processor 702.

Processor 702 uses the computer program to present on display 704 the image processing application and the data received through communications link 604 and commands and values transmitted by a user of computing device 602. It should also be noted that data received through communications link 604 or any other communications links may be received from any suitable source. Input device 706 may be a computer keyboard, a mouse, a keypad, a cursor-controller, dial, switchbank, lever, a remote control, or any other suitable input device as would be used by a designer of input systems or process control systems. Alternatively, input device 706 may be a finger or stylus used on a touch screen display 704. For receiving the voice queries described above, input device 706 may be a microphone.

Server 610 may include processor 720, display 722, input device 724, and memory 726, which may be interconnected. In a preferred embodiment, memory 726 contains a storage device for storing data received through communications link 608 or through other links, and also receives commands and values transmitted by one or more users. The storage device further contains a server program for controlling processor 720.

In some embodiments, the application may include an application program interface (not shown), or alternatively, the application may be resident in the memory of computing device 602 or server 610. In another suitable embodiment, the only distribution to computing device 602 may be a graphical user interface ("GUI") which allows a user to interact with the application resident at, for example, server 610.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

Accordingly, methods, systems, and media for image processing using hierarchical expansion are provided.

Although the disclosed subject matter has been described and illustrated in the foregoing illustrative embodiments, it is understood that the present disclosure has been made only by way of example, and that numerous changes in the details of implementation of the disclosed subject matter can be made without departing from the spirit and scope of the disclosed subject matter. Features of the disclosed embodiments can be combined and rearranged in various ways.

What is claimed is:

1. A method for image processing, the method comprising:
receiving, using a hardware processor, a plurality of images, wherein each of the plurality of images has one of a plurality of resolutions;
for a first image from the plurality of images that has a first resolution, determining, using the hardware processor, a first set of labels corresponding to each pixel of the first image; and
for a second image from the plurality of images that has a second resolution, generating, using the hardware processor, a second set of labels corresponding to each pixel of the second image based on the first set of labels by:
  (a) scaling, using the hardware processor, the first set of labels to generate a set of scaled labels;
  (b) determining, using the hardware processor, a set of proposed labels for each pixel of the second image based on the set of scaled labels;
  (c) generating, using the hardware processor, a probability score for each proposed label in the set of proposed labels;
  (d) selecting, using the hardware processor, a proposed label from the set of proposed labels based at least in part on the probability score; and
  (e) determining, using the hardware processor, whether to assign the proposed label for each pixel to the second set of labels of the second image.

2. The method of claim 1, further comprising:
generating an incremented proposed label by incrementing the selected proposed label by a given value; and
selecting, for each pixel in the second image, an updated label between the proposed label and the incremented proposed label using a graph cut technique.

3. The method of claim 1, wherein the first set of labels corresponds to a first set of disparity values between the first image and a third image, and wherein the second set of labels corresponds to a second set of disparity values between the second image and a fourth image.

4. The method of claim 1, further comprising:
selecting at least two proposed labels from the set of proposed labels based at least in part on the probability score; and
selecting one proposed label from the at least two proposed labels using a graph cut technique.

5. The method of claim 1, further comprising determining whether to replace an initial label corresponding to a pixel in the first image with a predetermined label.

6. The method of claim 1, further comprising:
determining that the second resolution is not a desired resolution; and
repeating (a)-(e) until an image having the desired resolution is reached.

7. The method of claim 1, wherein the second resolution is greater than the first resolution.

8. The method of claim 1, wherein the first set of labels is scaled by a scale factor that is determined based on the first resolution and the second resolution.

9. The method of claim 1, wherein the set of proposed labels associated with a pixel in the second image includes at least one scaled label associated with the pixel and a plurality of scaled labels from neighboring pixels.

10. The method of claim 1, further comprising selecting the first image and the second image based on resolution.

11. A system for image processing, the system comprising:
a hardware processor that:
receives a plurality of images, wherein each of the plurality of images has one of a plurality of resolutions;
for a first image from the plurality of images that has a first resolution, determines a first set of labels corresponding to each pixel of the first image; and
for a second image from the plurality of images that has a second resolution, generates a second set of labels corresponding to each pixel of the second image based on the first set of labels by:
(a) scaling the first set of labels to generate a set of scaled labels;
(b) determining a set of proposed labels for each pixel of the second image based on the set of scaled labels;
(c) generating a probability score for each proposed label in the set of proposed labels;
(d) selecting a proposed label from the set of proposed labels based at least in part on the probability score; and
(e) determining whether to assign the proposed label for each pixel to the second set of labels of the second image.

12. The system of claim 11, wherein the hardware processor is further configured to:
generate an incremented proposed label by incrementing the selected proposed label by a given value; and
select, for each pixel in the second image, an updated label between the proposed label and the incremented proposed label using a graph cut technique.

13. The system of claim 11, wherein the first set of labels corresponds to a first set of disparity values between the first image and a third image, and wherein the second set of labels corresponds to a second set of disparity values between the second image and a fourth image.

14. The system of claim 11, wherein the hardware processor is further configured to:
select at least two proposed labels from the set of proposed labels based at least in part on the probability score; and
select one proposed label from the at least two proposed labels using a graph cut technique.

15. The system of claim 11, wherein the hardware processor is further configured to determine whether to replace an initial label corresponding to a pixel in the first image with a predetermined label.

16. The system of claim 11, wherein the hardware processor is further configured to:
determine that the second resolution is not a desired resolution; and
repeat (a)-(e) until an image having the desired resolution is reached.

17. The system of claim 11, wherein the second resolution is greater than the first resolution.

18. The system of claim 11, wherein the first set of labels is scaled by a scale factor that is determined based on the first resolution and the second resolution.

19. The system of claim 11, wherein the set of proposed labels associated with a pixel in the second image includes at least one scaled label associated with the pixel and a plurality of scaled labels from neighboring pixels.

20. The system of claim 11, wherein the hardware processor is further configured to select the first image and the second image based on resolution.

21. A computer-readable medium containing computer-executable instructions that, when executed by a processor, cause the process to perform a method for image processing, the method comprising:
receiving a plurality of images, wherein each of the plurality of images has one of a plurality of resolutions;
for a first image from the plurality of images that has a first resolution, determining a first set of labels corresponding to each pixel of the first image; and
for a second image from the plurality of images that has a second resolution, generating a second set of labels corresponding to each pixel of the second image based on the first set of labels by:
(a) scaling the first set of labels to generate a set of scaled labels;
(b) determining a set of proposed labels for each pixel of the second image based on the set of scaled labels;
(c) generating a probability score for each proposed label in the set of proposed labels;
(d) selecting a proposed label from the set of proposed labels based at least in part on the probability score; and
(e) determining whether to assign the proposed label for each pixel to the second set of labels of the second image.

22. The computer-readable medium of claim 21, wherein the method further comprises:
generating an incremented proposed label by incrementing the selected proposed label by a given value; and
selecting, for each pixel in the second image, an updated label between the proposed label and the incremented proposed label using a graph cut technique.

23. The computer-readable medium of claim 21, wherein the first set of labels corresponds to a first set of disparity values between the first image and a third image, and wherein the second set of labels corresponds to a second set of disparity values between the second image and a fourth image.

24. The computer-readable medium of claim 21, wherein the method further comprises:
selecting at least two proposed labels from the set of proposed labels based at least in part on the probability score; and
selecting one proposed label from the at least two proposed labels using a graph cut technique.

25. The computer-readable medium of claim 21, wherein the method further comprises determining whether to replace an initial label corresponding to a pixel in the first image with a predetermined label.

26. The computer-readable medium of claim 21, wherein the method further comprises:
determining that the second resolution is not a desired resolution; and repeating (a)-(e) until an image having the desired resolution is reached.

27. The computer-readable medium of claim 21, wherein the second resolution is greater than the first resolution.

28. The computer-readable medium of claim 21, wherein the first set of labels is scaled by a scale factor that is determined based on the first resolution and the second resolution.

29. The computer-readable medium of claim 21, wherein the set of proposed labels associated with a pixel in the second image includes at least one scaled label associated with the pixel and a plurality of scaled labels from neighboring pixels.

30. The computer-readable medium of claim 21, wherein the method further comprises selecting the first image and the second image based on resolution.

* * * * *